Figure 1:
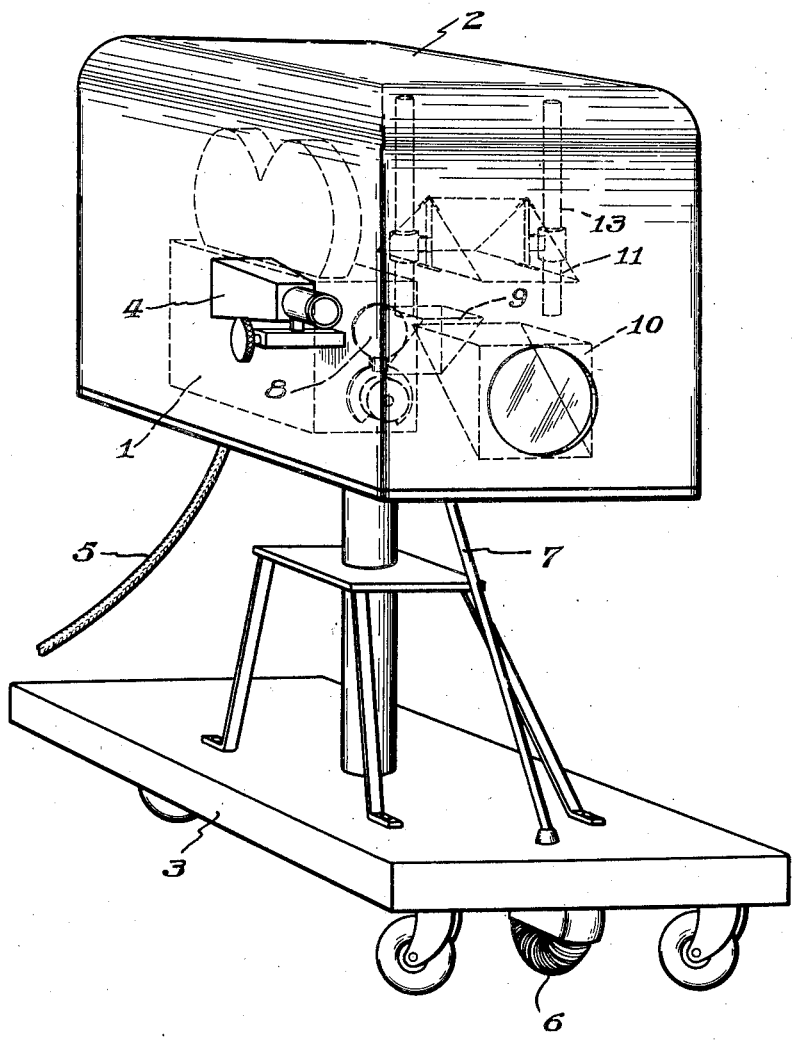

Oct. 31, 1939.  A. N. GOLDSMITH  2,178,228
MOTION PICTURE APPARATUS FOR APPROACH SHOTS.
Filed Dec. 31, 1936  4 Sheets-Sheet 3
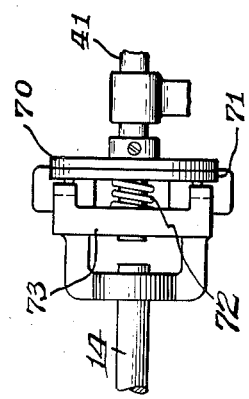
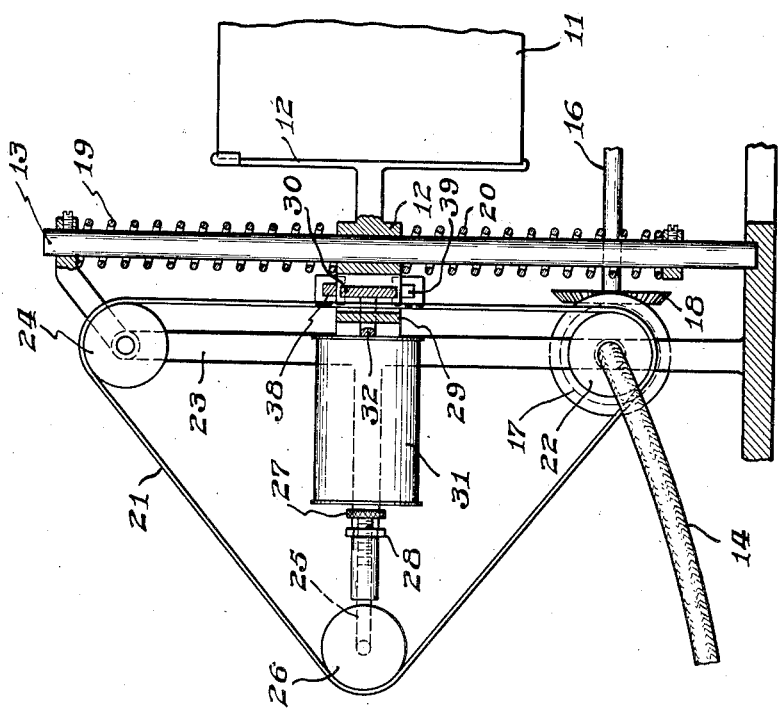
INVENTOR
ALFRED N. GOLDSMITH
BY
ATTORNEY Oct. 31, 1939.  A. N. GOLDSMITH  2,178,228
MOTION PICTURE APPARATUS FOR APPROACH SHOTS
Filed Dec. 31, 1936  4 Sheets—Sheet 4

INVENTOR
ALFRED N. GOLDSMITH
BY
ATTORNEY

Patented Oct. 31, 1939

2,178,228

UNITED STATES PATENT OFFICE 2,178,228

MOTION PICTURE APPARATUS FOR APPROACH SHOTS

Alfred N. Goldsmith, New York, N. Y., assignor to Radio Corporation of America, a corporation of Delaware Application December 31, 1936, Serial No. 118,435

12 Claims. (Cl. 88—16)

This invention relates to motion picture apparatus for approach shots and more particularly to an apparatus for supporting the camera in the same general manner as is done by what is known as a "camera dolly", and for compensating for the variations in focus in the camera during the making of approach shots.

In the taking of motion pictures, it has been customary for many years in certain types of scenes to start the scene from a considerable distance from the principal actors and, as the scene progresses, to move the camera gradually toward the actors until, at the conclusion, the camera is very close to them. In thus moving the camera, it is necessary to keep the camera lens in proper focus and this was at first done by manual focusing of the camera. It was later discovered that the focusing of the camera lens could be done more accurately mechanically and apparatus, such, for example, as those of Del Riccio Patent No. 1,925,524 and Jaharus and Hunt application Serial No. 617,098, filed June 14, 1932 were devised. These devices caused the camera lens to be kept more accurately in average focus during the movement thereof than had previously been accomplished. There was, however, an additional error in focus remaining, which was inherent in the construction of the usual motion picture cameras and which was not avoided by the aforesaid devices. In the usual motion picture camera the film is moved intermittently at a speed of about twenty-four frames a second and with the period of film movement approximately equal to the period of film dwell. The film is held stationary in the film gate during the period the shutter is open and the shutter is then closed and the film moved and the shutter re-opened. When the camera is being moved toward or away from the object during this period, while the film is stationary and the shutter is open, if no change in focus of the lens is made, the picture becomes blurred due to the fact that part of the time it is out of focus. On the other hand, if the lens is adjusted to correct for the change in focal distance, a corresponding change in image size is produced which produces a blur on the picture about as serious as that produced by the failure to so focus the camera.

My invention relates to an apparatus for and method of overcoming this blur due to either focusing of the lens or failure to focus during the movement of the camera and I accomplish this novel result by maintaining the optical distance from the camera to the object constant during the period the shutter is open, while maintaining the lens in a fixed focal position. When the shutter closes, I then decrease the optical path by the appropriate amount and re-focus the lens a corresponding amount so that the next succeeding picture starts with the lens in proper focus and with the optical distance again kept constant during its taking, irrespective of movement of the camera toward or away from the object.

Although I have referred to my apparatus as being adapted for "approach" shots, it will be apparent to those skilled in the art that it may be used in the same manner when the camera is being withdrawn from the scene to take in a greater field of view and will operate in a corresponding manner.

One object of my invention is to compensate for errors in image size due to camera movement during exposure.

Another object of my invention is to compensate for errors in focus due to camera movement during exposure.

Another object of my invention is to maintain the optical distance from the film to the lens and from the lens to the object constant during exposure.

Figure 2:
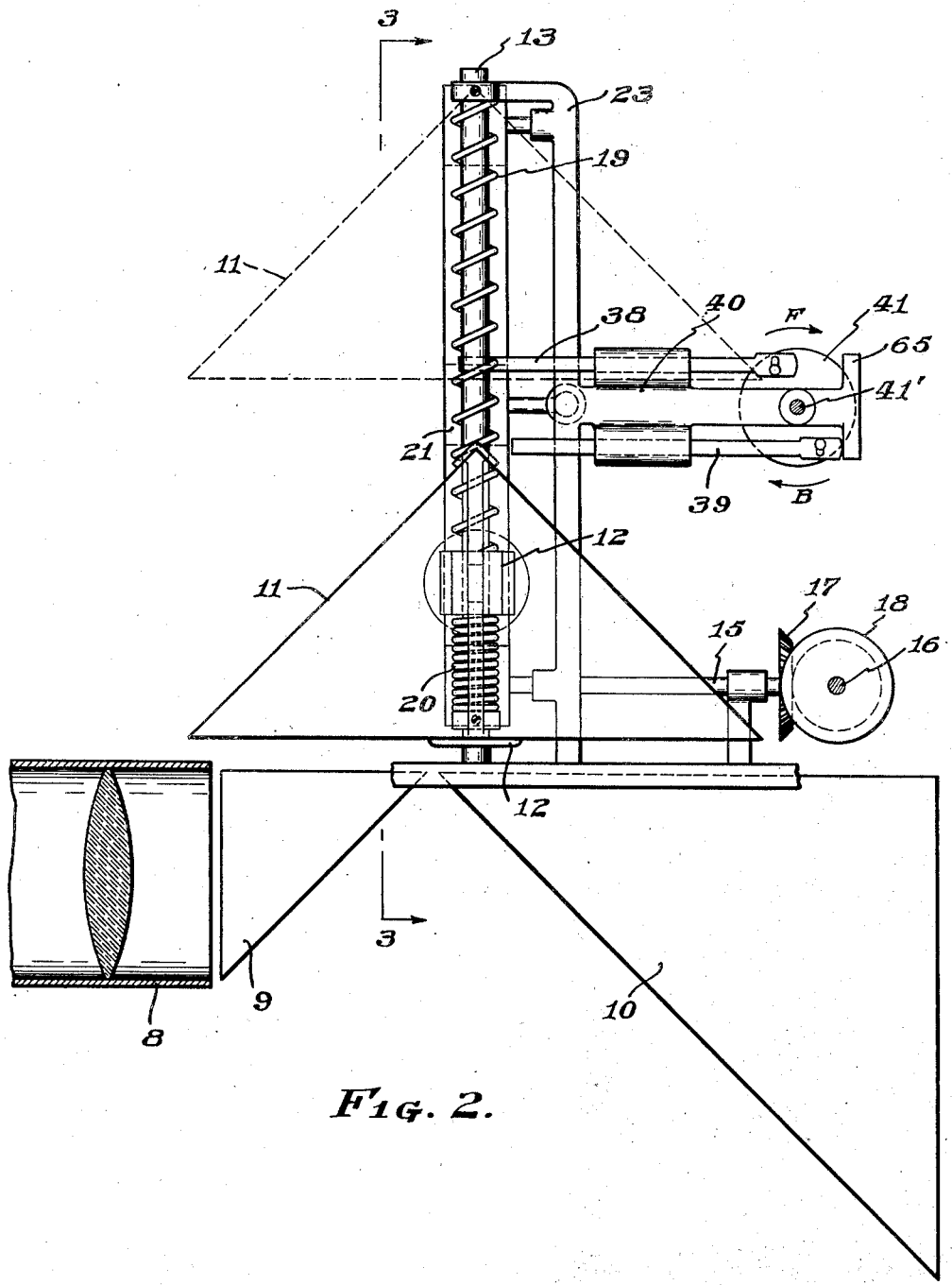
Figure 4:
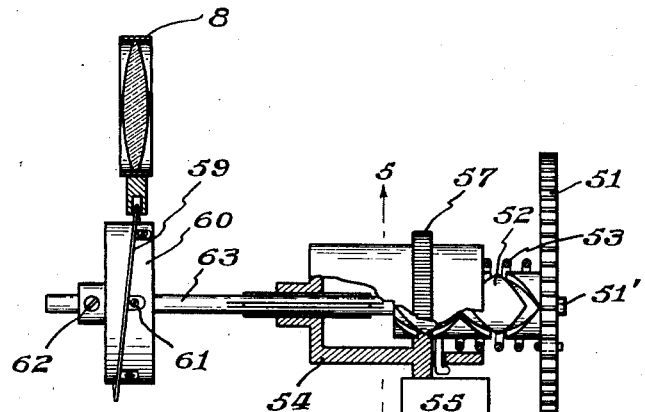
Figure 5:
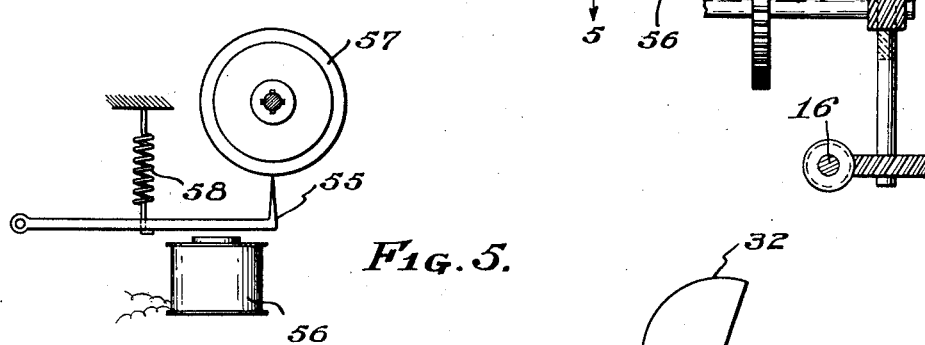
Figure 6:
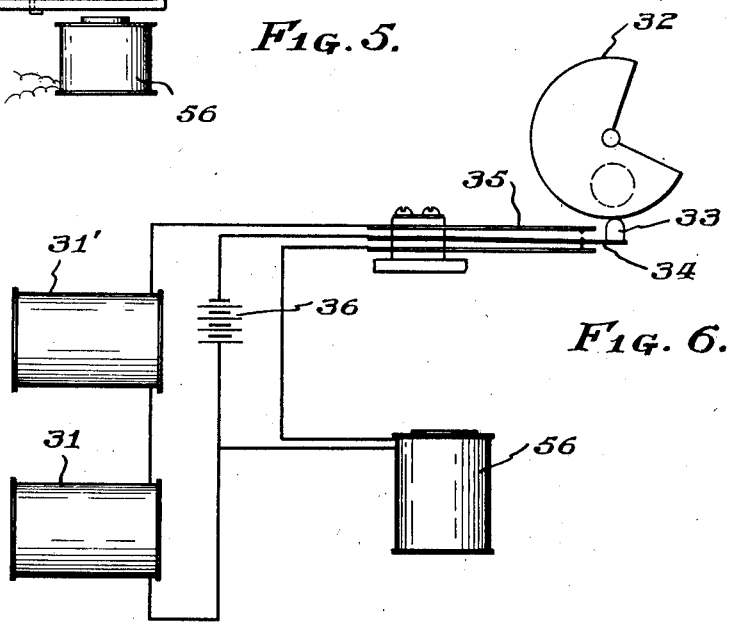

Other incidental objects of my invention will be apparent to those skilled in the art from a reading of the following specification and an inspection of the accompanying drawings in which Figure 1 is a perspective phantom view of the apparatus according to my invention, Figure 2 is a vertical section in the plane of the optical axis showing the apparatus for moving a reflecting prism in accordance with the movement of the camera and in synchronization of the operation of the shutter, Figure 3 is a vertical view taken perpendicularly to Fig. 2 on the line 3—3 and showing the magnetic clutch mechanism which is used to actuate the prism, Figure 4 is a longitudinal view, partly in section, of the lens focusing means, Fig. 5 is a view taken on the line 5—5 of Fig. 4, Figure 6 is a detail view showing one form of synchronizing switch which may be used to control the electrical portions of the apparatus from the camera shutter, and Figure 7 shows a form of overrunning clutch which may be used in conjunction with the apparatus to determine the direction of operation thereof in accordance with the direction of the motion of the camera.

Referring first to Fig. 1, a motion picture camera 1 of any usual type is provided. This camera, together with the attendant mechanism, is mounted within a sound proof casing 2, as is customary in recording sound pictures. This casing is mounted, in turn, upon a camera dolly generally designated at 3, but which differs from conventional camera dollies in respects hereinafter described. An appropriate finder 4 is mounted upon the exterior of the casing 2 in order that the operator may accurately follow the direction of the camera. The camera is driven, as is customary, by a synchronous motor in order that it may be synchronized with the sound recorder and the driving connections and other incidental connections are enclosed within the cable 5.

The camera dolly may, of course, be moved in any desired direction but only movement toward or away from the object upon which the camera is focused is material as far as the present invention is concerned. The camera dolly is accordingly provided with an integrating wheel 6, such as described in detail in the aforesaid Del Riccio Patent No. 1,925,524 in order to control the focus of the camera lens. This integrating wheel is connected through an appropriate shaft 7 to the compensating mechanism within the casing 2.

In front of the objective 8 of the camera there is mounted a right angle reflecting prism 9 and in alignment with this is mounted a second stationary right angle reflecting prism 10. It will be apparent that light from the object entering through the prism 10 will be directed upward, where it strikes the doubly right angle prism 11, which directs it parallel to its original direction and then downwardly into the prism 9, which directs it along its original direction through the objective 8 of the camera.

The prism 11 is connected to the shaft 7 in a manner hereinafter described in detail so that as the camera approaches the object while the shutter is open, the prism 11 is raised by half the distance of the camera movement, thereby increasing the optical path by twice the distance of the prism movement and maintaining the optical distance from the objective 8 to the object being photographed constant.

To now explain in greater detail the apparatus for controlling the movement of the prism and its synchronization with the shutter. The prism 11 is mounted in a pair of brackets 12 (Fig. 3) which slide vertically upon the guide posts 13. The shaft 7 is provided with a flexible extension 14 which drives the shaft 15 and the transverse shaft 16 through the gears 17 and 18. The shaft 16 drives a shaft on the opposite side of the prism 11 which is a counterpart of the shaft 15 and which actuates a prism actuating means identical with that actuated by the shaft 15. The prism bracket 12 is mounted between a pair of balanced springs 19 and 20 which tend to maintain the prism 11 in a position midway of the height of the guide posts 13. From this mid-position, the prism is shifted in accordance with one-half of the axial movement of the camera dolly 3 by means of the belt 21 actuated from the shaft 15. This shaft 15 is provided with a pulley 22 over which the belt 21 passes, and an upright brace 23, which serves also to support the guide member 13, carries a pulley 24 and a bracket 25 supporting a pulley 26. The belt 21 passes over both the pulleys 24 and 26 which serve to maintain it taut. In order to insure that the belt 21 remains taut, the bracket 25 is provided with an adjusting screw 27 and a lock nut 28, by means of which the pulley 26 may be extended upon the bracket.

Engagement of the prism bracket 12 with the belt 21 is effected by means of the magnetic clutch comprising the stationary member 29, which is integral with the bracket 12 and the movable member 30, which is controlled by the magnet 31. This member 30 is made integral with a yoke 32 extending around the stationary member 29 and which serves as the armature of the magnet 31. When current is supplied to the magnet 31, the armature 32 is attracted, the movable member 30 is drawn forcibly toward the member 29, and the belt 21 is grasped between the members 29 and 30, thereby causing the bracket 12 and the prism 11 to move in the direction of the movement of the belt 21 and at the same speed against the resilience of the springs 19 or 20, as the case may be.

The magnet 31 and its counterpart 31' at the opposite end of the prism are shown diagrammatically in Fig. 6, together with their actuating connections. It will be seen from this figure that the camera shutter 32 is provided with a contact member 33 which actuates the switch spring 34. When the open segment of the shutter 32 is in alignment with the member 33, the switch spring 34 comes in contact with the upper contact member 35 and closes the circuit through the battery 36 and the magnets 31 and 31', thereby causing the prism 11 to move in accordance with the movement of the belts 21 during the time that the shutter is open.

The member 23 is provided with an extension 65 parallel with the optical axis of the apparatus and which carries the crank plate 41 on the shaft 41'. This shaft 41' extends across the apparatus and is connected to another identical crank plate at the opposite side of the prism 11. The member 65 is provided with guides 40 through which slide the stops 38 and 39, which are selectively brought into operative position by means of the crank plate 41. The shaft 41' is actuated by an overrunning clutch shown in Fig. 7, wherein the member 70 is rigidly connected to the shaft 41', while the member 71, which is pressed against the member 70 by the spring 72, is adapted to slip on the member 70 when the shaft 41' reaches one of its extremes of movement.

The yoke 73 is connected through appropriate shafting to the shaft extension 14 or the shaft 16 so that the member 70 will be rotated in a direction corresponding to the direction of motion of the camera dolly. When the camera dolly is moved forward toward the object the cam plate 41 will be moved in the direction of the arrow F, thereby bringing the stop 39 into operative relation with the prism bracket 12, while when the dolly is moved backward or away from the object, the stop 38 will be brought into operative relation and the stop 39 withdrawn. These two stops cooperate with the prism bracket 12 as shown in Fig. 3 in such a manner that the stop which is operative will always serve to stop the prism bracket 12 at its mid position.

The manner of operation of this prism drive mechanism is as follows: As the camera dolly is moved toward the object, the stop 39 is brought into operative position, preventing movement of the prism 11 below this point and permitting movement thereof upwardly from the stop. When the camera shutter 32 closes the circuit through the magnets 31 and 31' the camera bracket 12 is secured to the moving belt 21 and, as the camera dolly approaches the object, the prism 11 is thereby caused to move upwardly at half the speed of movement of the camera dolly, while the shutter remains open. When the shutter 32 presses down on the member 33 and opens the circuit through the magnets 31 and 31', the clutch member 30 is released and the prism is returned by the spring 19 to its mid position against the stop 39, whence it is ready to proceed with another movement when the shutter is again opened.

The focusing of the camera objective is accomplished during the time the shutter is closed and is performed as follows: A shaft 50 is connected by appropriate gearing to the shaft 16 and serves to drive the gear 51. This gear 51 is mounted upon a shaft 51' and is connected to the spring 53. This spring 53 is, in turn, connected to the barrel 54 having the toothed ring 57 thereon. The barrel 54 is retained in stationary position by means of the pawl 55, which is held against the ring 57 by the spring 58 (Fig. 5). As the camera dolly is moved the gears 50 and 51 are rotated a proportionate amount, thereby winding up the spring 53 in one direction or the other. The member 52 is provided with spiral grooves as shown with which the projections on the interior of the barrel 54 engage. As the spring 53 is wound up it tends to become shorter and movement of the barrel 54 along the member 52 allows for this shortening of the spring. The barrel 54 is permitted to move longitudinally on the shaft 63 but is prevented from rotation relative to the shaft 63 by splines shown. When the shutter 32 (Fig. 6) presses downwardly on the member 33 the circuit is closed through the lower contact of the switch and the magnet 56 energized, thereby attracting the pawl 55 and withdrawing it from the toothed ring 57. This permits the previous winding of the spring to become effective upon the shaft 63 to rotate the cam members 59 and 60. The objective 8 is accordingly moved in the appropriate direction to bring it in exact focus upon the object with the prism 11 in the mid position. Rotation of the shaft 63 and the cam 59 is permitted during the entire time that the shutter remains closed, thereby insuring that when the shutter opens the objective 8 will be in exact focus. When the shutter 32 opens, the circuit through the magnet 56 is likewise opened, the pawl 55 again engages the ring 57 and further movement of the objective is prevented during this period, while the prism 11 keeps the object in proper focus during movement of the camera.

In order to permit easy adjustment of the cam 59 in relation to the cam drum 60 in order to accommodate the cam to supply varying objectives, the cam 59 is secured to the drum 60 by means of screws 61 passing through slots in the ears on the cam. By loosening these screws and shifting the cam, the lens may be brought into exact focus for the location of each screw and the cam will thereby accommodate itself at all points therebetween.

It will be apparent from the foregoing that I have provided a new and improved motion picture apparatus wherein the object is maintained in exact focus at all times, regardless of the movement of the camera and without any blurring of the image due to any changing of the focus or improper focus during the exposure period.

Having now described my invention, I claim:

1. Apparatus of the class described comprising a motion picture camera, means supporting said camera for axial movement relative to an object, and means for maintaining the optical distance of the camera from the object the same over a limited period of time during said movement.

2. Apparatus of the class described comprising a motion picture camera, means for movably supporting said camera, means for compensating for movement of said camera in the direction of its optical axis, said compensating means including means for maintaining the optical path from the camera to the object being photographed uniform over a limited period of time during said movement.

3. Apparatus of the class described comprising a motion picture camera, means for movably supporting said camera, means for compensating for movement of said camera in the direction of its optical axis, said last means including means for maintaining the optical path from said camera to the object being photographed of uniform length during said movement while the shutter is open, and means for refocusing said camera only when the shutter is closed.

4. Apparatus of the class described comprising a motion picture camera, means for movably supporting said camera, means for compensating for movement of said camera in the direction of its optical axis, the said means including a plurality of reflecting means between the camera and the object, means for moving at least one of said reflecting means in relation to the others to maintain the optical path from the camera to the object of uniform length during the time the camera shutter is open, and means for automatically focusing the camera lens during the time the shutter is closed.

5. Apparatus of the class described comprising a motion picture camera, means supporting said camera for movement, and means actuated by contact with the surface over which said supporting means operates for maintaining the optical distance of the camera from the object the same over limited periods of time during said movement toward or away from the object.

6. Apparatus of the class described comprising a motion picture camera, means for movably supporting said camera, means actuated by contact with the surface over which said supporting means operates for compensating for movement of said camera in the direction of its optical axis, said compensating means including means for maintaining the optical path from the camera to the object being photographed uniform over limited periods of time during movement toward or away from the object.

7. Apparatus of the class described comprising a motion picture camera, means for movably supporting said camera, means actuated by contact with the surface over which said supporting means operates for compensating for movement of said camera in the direction of its optical axis, said last means including means for maintaining the optical path from said camera to the object being photographed of uniform length while the shutter is open, and means for refocusing said camera when the shutter is closed.

8. Apparatus of the class described comprising a motion picture camera, means for movably supporting said camera, means actuated by contact with the surface over which said supporting means operates for compensating for movement of said camera in the direction of its optical axis, the said means including a plurality of reflecting means; means for moving at least one of said reflecting means in relation to the others to maintain the optical path from the camera to the object of uniform length during the time the camera shutter is open, and means for automatically focusing the camera lens during the time the shutter is closed.

9. The method of making motion pictures comprising the steps of moving the camera continuously in relation to the object being photographed, making a series of pictures at uniform intervals while the camera is being moved, maintaining the optical distance from the camera to the object constant during the periods when the shutter is open, and refocusing the camera during the periods when the shutter is closed.

10. The method of making approach shots with a motion picture camera comprising the steps of moving the camera continuously toward the object, making a series of pictures at uniform intervals while the camera is being moved, maintaining the optical distance from the camera to the object constant during exposure and focusing the camera lens for the decreased distance while the camera shutter is closed.

11. The method of making motion pictures comprising the steps of moving the camera continuously in relation to the object being photographed, making a series of pictures at uniform intervals at normal speed while the camera is being moved, maintaining the optical distance from the camera to the object constant during the periods when the shutter is open, and refocusing the camera during the periods when the shutter is closed.

12. The method of making approach shots with a motion picture camera comprising the steps of moving the camera continuously toward the object, making a series of pictures at uniform intervals at normal speed while the camera is being moved, maintaining the optical distance from the camera to the object constant during exposure and focusing the camera lens for the decreased distance while the camera shutter is closed.

ALFRED N. GOLDSMITH.